United States Patent
Sawafuji

[11] Patent Number: 5,825,285
[45] Date of Patent: Oct. 20, 1998

[54] PORTABLE TRANSMITTER FOR TIRE AIR PRESSURE WARNING APPARATUS

[75] Inventor: Kazunori Sawafuji, Ogaki, Japan

[73] Assignee: Pacific Industrial Co., Ltd., Ogaki, Japan

[21] Appl. No.: 525,978

[22] Filed: Sep. 7, 1995

[51] Int. Cl.[6] .................................................. B60C 23/00
[52] U.S. Cl. ........................ 340/445; 340/442; 73/147.4; 116/34 R; 200/61.22
[58] Field of Search .................................... 340/445, 442; 343/745, 702, 895, 866; 73/146, 146.4, 146.8; 116/34 R; 200/61.22

[56] References Cited

U.S. PATENT DOCUMENTS

| | | | |
|---|---|---|---|
| 3,950,726 | 4/1976 | Fujikawa et al. | 340/447 |
| 5,365,247 | 11/1994 | Van Der Veen et al. | 343/745 |
| 5,409,777 | 4/1995 | Kennedy et al. | 428/411.1 |

FOREIGN PATENT DOCUMENTS 5-65040  8/1993  Japan.

*Primary Examiner*—Jeffery Hofsass
*Assistant Examiner*—Edward Lefkowitz
*Attorney, Agent, or Firm*—Sheridan Ross P.C.

[57] ABSTRACT

A tire air warning apparatus attached to a wheel of the vehicle is disclosed. The apparatus includes a sensor which detects tire air pressure lower than a predetermined value and a transmitter which outputs a signal in accordance with an instruction from the sensor. The transmitter accommodates a transmitting substrate, an electric power source and an antenna electrically connected with the substrate. The transmitter is filled up with a non-conductive resin to fix the substrate, power source and antenna in the transmitter.

10 Claims, 5 Drawing Sheets

PORTABLE TRANSMITTER FOR TIRE AIR PRESSURE WARNING APPARATUS

BACKGROUND OF THE INVENTION

1. Field of the Invention

The present invention relates to an apparatus which warns a driver of abnormal air pressure in an automobile tire using a radio signal.

2. Description of the Related Art

During driving of a vehicle, a decline in tire air pressure leads to uncomfortable driving and degrades vehicle performance. Therefore, there is a need to warn a driver of the decrease in tire air pressure so that proper measures may be taken. Accordingly, apparatuses which detect low tire air pressure and warn the driver have been proposed.

Such apparatuses detect reduced tire air pressure and then transmit the detected result with a transmitter to warn the driver visually or audibly. FIG. 7 shows a conventional transmitter 100 of a tire air pressure warning apparatus which is fixed to a wheel rim 108 of an automobile. The transmitter 100 is provided with a detecting switch 103 and a transmitting portion 113 at the lower and upper portion of the housing 105. The detecting switch 103 detects a decline in tire air pressure while the transmitting portion 113 transmits the detected result to a warning device in an interior of the automobile. The detecting switch 103 will now be described. A plate 119, which closes the bottom portion of the housing 105, is provided with a communicating hole 104 through which the air in the tire flows. A rubber bellows 106 is held between a sleeve 120, secured in the housing 105, and the plate 119. A conductive plate 112, which is stationary, is supported on the bottom end of the transmitting portion 113. A movable spool 110, which is tubular and has a closed bottom, is supported by the bellows 106 at its bottom. A spring 111 is set between the bottom surface of the conductive plate 112 and the movable spool 110.

When the air pressure is normal, or above a predetermined value, the pressure of the air entering the housing 105 through the communicating hole 104 acts on the bellows 106 and raises the spool 110 against the force of the spring 111. Hence, a contact point 109 provided on a flanged portion of the spool 110 moves away from a contact point 107 which is provided on a portion projecting from the inner cylindrical surface of the sleeve 120. This deactivates the switch 103. When the air pressure becomes lower than a predetermined value, the spring 111 moves the spool 110 downward and causes the points 107, 109 to come into contact with each other. This activates the switch portion.

The transmitting portion 113 comprises a circuit board 115 to process signals and a battery 114 placed above the circuit board 115. When the switch 103 is activated, an antenna 117 transmits a warning signal from the circuit board 115, which is in contact with the conductive plate 112, to a warning device inside the automobile. The warning device warns the driver through a proper means, visually or audibly.

However, since the bellows 106 of the detecting switch 103 is made of a rubber material, wear resistance is low. Thus, frequent exchanging of the bellows 106 results in economic problems.

Furthermore, vibrations may move the spool 110, which is supported by only the spring 111 and the bellows 106. This may cause false warning signals when the two contact points 107, 109 come into contact with each other. As a result, the reliability of the detecting switch 100 is low.

An improved detecting switch has been proposed as shown in FIG. 6. This detecting switch 200 includes a housing 201, a bellows case 202 attached to the bottom portion of the housing 201, a cylindrical passage 203 extended in the housing 201, a rod 204 disposed in the passage 203, a substantially T-shaped base 205 with the bottom portion of the rod 204 securely connected thereon, and a bellows 206 encompassing the base 205. When a transmitting portion is attached to the detecting switch 200, a contact point 21 hanging from the transmitting portion contacts the top end of the rod 204. A contact screw 207 is screwed into the center portion of the bellows case 202 projecting upwards. Each of the above constituents are made from a conductive material. Therefore, when the air pressure of the tire becomes lower than a predetermined value, the pressure of the air which enters through a hole 208 causes contact between the bellows 206 and the contract screw 207. This electrically connects the rod 204 with the housing 201 thereby causing a signal to be transmitted from the transmitting portion to warn the driver.

When the tire air pressure is normal, or above a predetermined value, a packing 210 and a film 209, both made of an insulating material, electrically disconnect the rod 204 from the housing 201. Therefore, the transmitting portion does not transmit signals.

In the transmitting portion, various electronic components are attached to a circuit board which processes signals. Hence, damage may be inflicted to the soldered portions of the electronic components due to external impact or centrifugal force acting on the transmitter, which is mounted on the wheel rim. In addition, moisture condenses between neighboring electronic components. The moisture reduces the transmitting level and may cause malfunctions. Therefore, reliability of the transmitting portion is low.

SUMMARY OF THE INVENTION

The object of the present invention is to provide a portable transmitter for a tire air pressure warning apparatus which is capable of stable functioning and has a high reliability.

A further object of the present invention is to provide a transmitter for a tire air pressure warning apparatus which is superior in its economic benefits.

Another object of the present invention is to provide a transmitter for a tire air pressure warning apparatus which is capable of preventing reduction in transmitting level due to impact, centrifugal force, and humidity.

To achieve the above objects, a tire pressure warning apparatus attached to a wheel of the vehicle is proposed. The apparatus includes a sensor which detects tire air pressure lower than a predetermined value and a transmitter which outputs a signal in accordance with an instruction from the sensor. The transmitter accommodates a transmitting substrate, an electric power source and an antenna electrically connected with the substrate. The transmitter is filled up with a non-conductive resin to fix the substrate, power source and antenna in the transmitter.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

Figure 1:
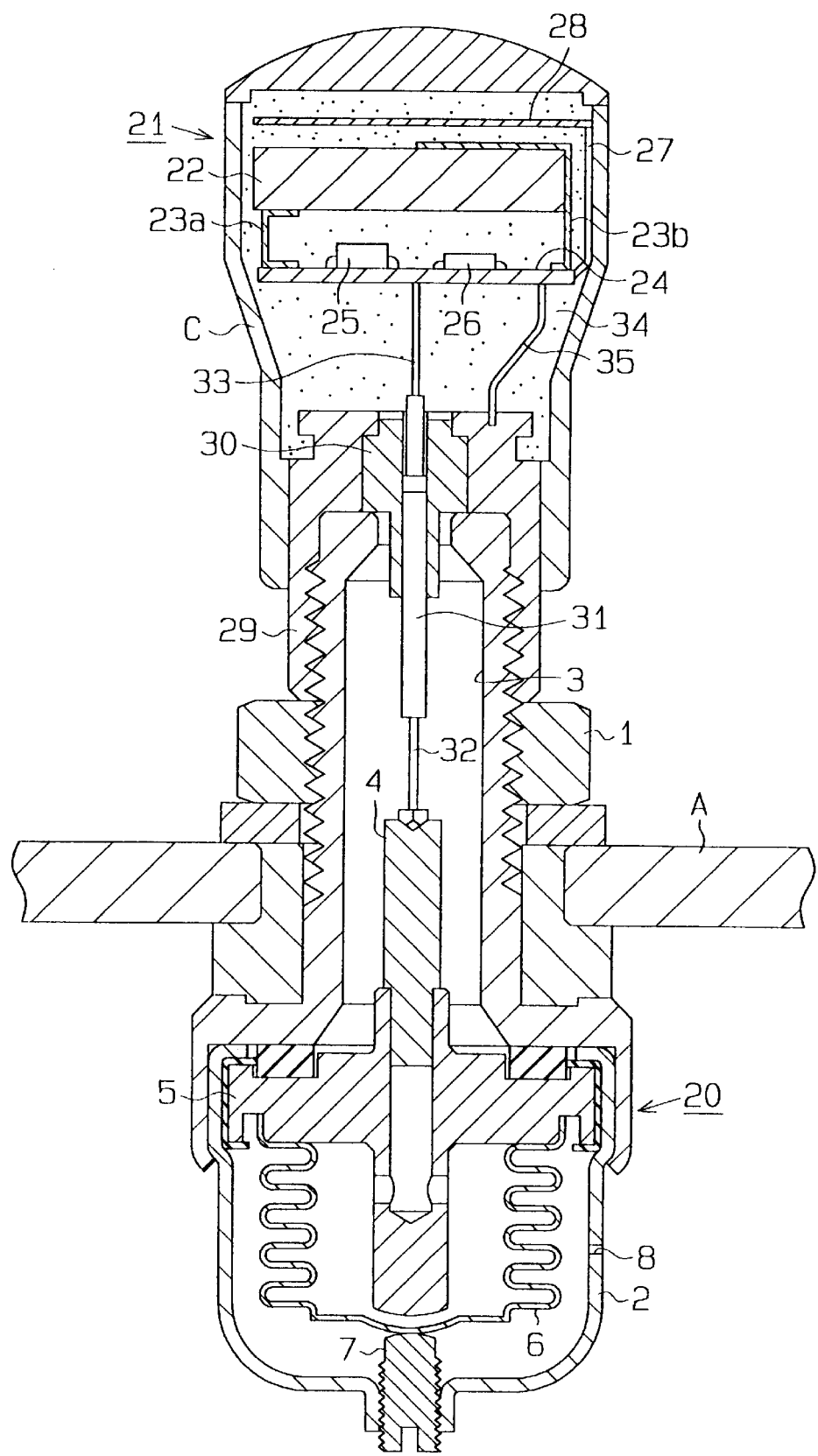
FIG. 1 is a cross-sectional view showing a transmitter for a warning apparatus, in a low tire air pressure state, according to a first embodiment of the present invention.
Figure 6:
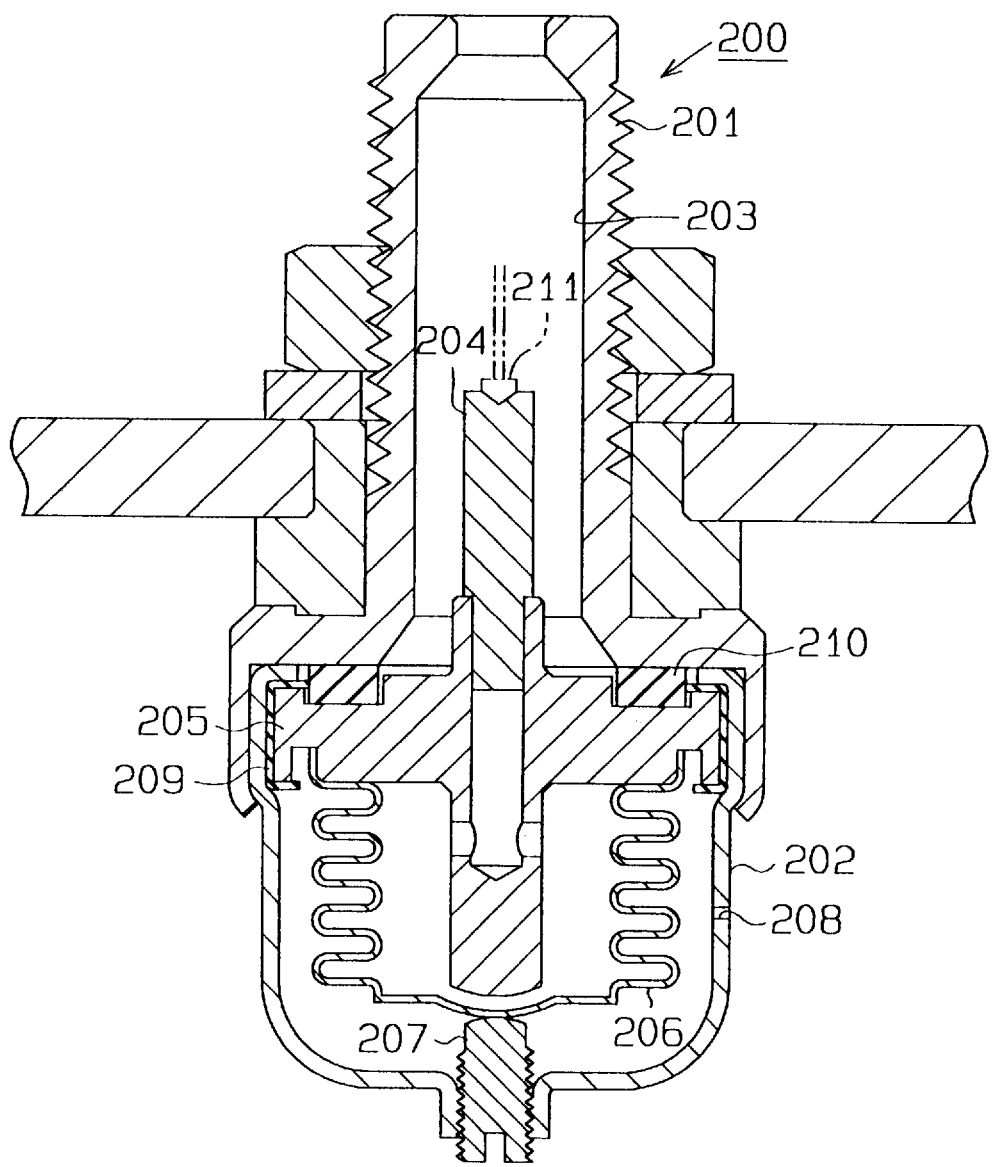
FIG. 6 is a cross-sectional view showing a conventional portable transmitter.

A first embodiment according to the present invention will be described with reference to FIG. 1. A transmitter is mounted on a rim A of an automobile tire. The transmitter comprises a detecting switch 20 and a transmitting portion 21, which is attached on the switch 20. Since the detecting switch 20 is identical to the previously described conventional detecting switch of FIG. 6, a description of the switch will not be given. Furthermore, the parts of the switch 20 will be labeled with a single digit number using the last digit of the corresponding reference character of FIG. 6.

The transmitting portion 21, which is detachably screwed on to the detecting switch 20, includes a cap C at its upper portion. A battery 22 is connected to a transmitting circuit board 24 via electric terminals 23a, 23b. Various electronic components 25, 26 are attached to the circuit board 24. A disk antenna 28 is connected to the circuit board 24 via a feeder wire 27.

A tubular joint 29, which is made of a conductive material, is secured to the bottom portion of the cap C. The joint 29 is connected with the circuit board 24 by a lead wire 35. A pin holder 30, made of an insulating material, is supported in the joint 29. A contact probe 31, connected with the circuit board 24 via a lead wire 33, which is attached to the bottom surface of the board 24, is fixed in the pin holder 30. A tip 32, movable in the vertical direction, is attached at the bottom end of the contact probe 31. In this state, the inside of the cap C is entirely filled with silicone resin 34. Consequently, the inside of the cap C is secured when the silicone resin 34 hardens.

In the above structure, an electrical connection between the joint 29 and contact probe 31 causes the transmission of radio waves from the circuit board 24 through the antenna 28. In other words, when the tire air pressure becomes lower than a predetermined value, a bellows 6 of the detecting switch 20 comes into contact with a contact screw 7 and electrically connects the joint 29 with the contact probe 31. This activates the transmitting portion 21 thus sending the radio wave from the antenna 28.

In the above transmitting portion 21, the circuit board 24 is fixed inside the cap C by the silicone resin 34. As a result damage at the soldered portions of the electronic components 25, 26 is prevented. Furthermore, condensation of moisture between the electronic components 25, 26 does not occur.

Figure 2:
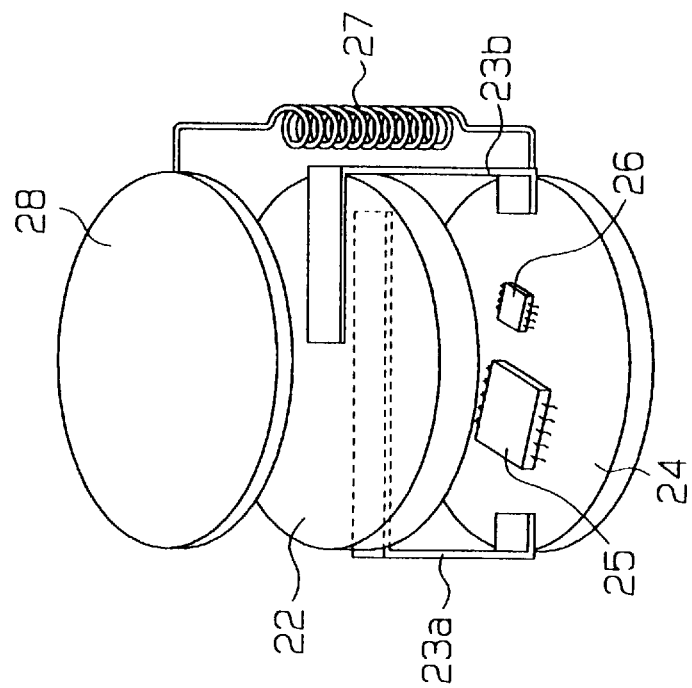
FIG. 2 is a perspective view of an antenna connected to a transmitting circuit board according to a second embodiment of the present invention.
Figure 7:
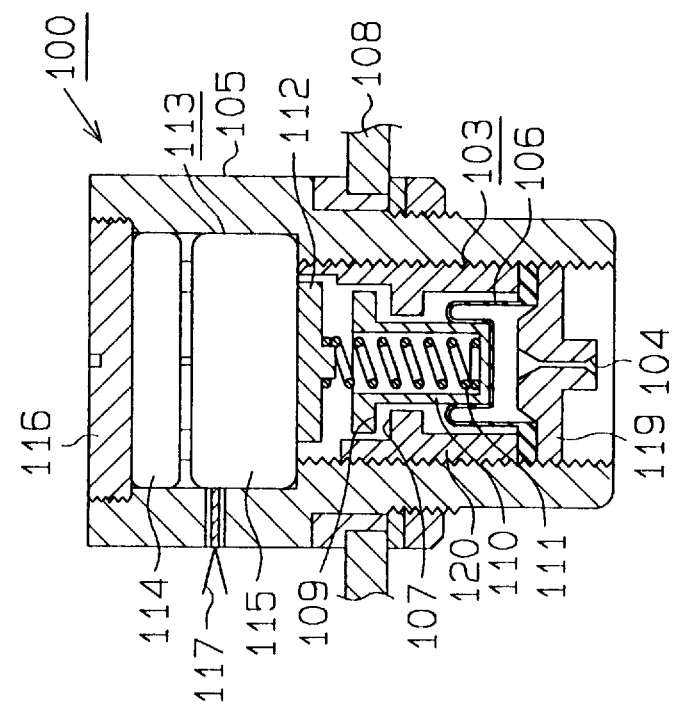
FIG. 7 is a cross-sectional view showing a detecting switch of another conventional transmitter.

A second embodiment of the present invention will be described with reference to FIG. 2.

In this embodiment, the feeder wire 27, which connects the disk antenna 28 with the transmitting circuit board 24, is spirally formed. In other words, with the straight feeder wire 27 of the first embodiment, leakage of high frequency electricity, which should be conveyed from the circuit board 24 to the antenna 28, from the wire 27 slightly reduces the conveying efficiency and reduces the transmitting level. To improve this problem, the applicant has conducted the following experiment.

Figure 3A:
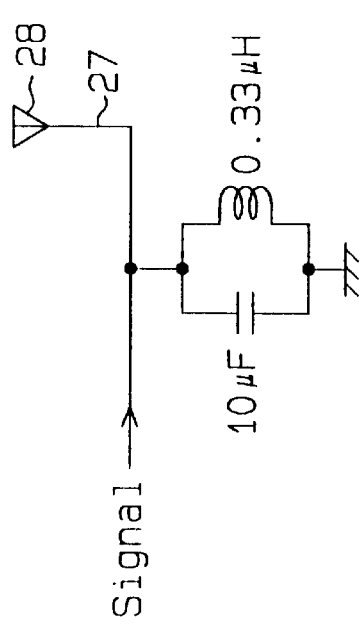
FIG. 3A is a frequency multiplying circuit diagram of a transmitting portion of the first embodiment.
Figure 3B:
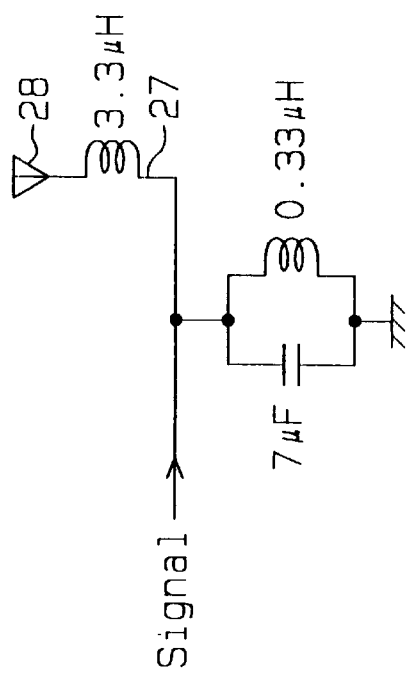
FIG. 3B is a frequency multiplying circuit diagram of a transmitting portion of the second embodiment.
Figure 4:
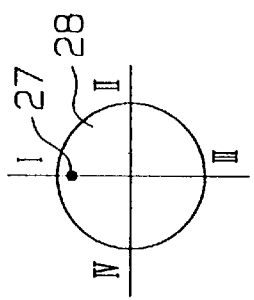
FIG. 4 is a plan view of the antenna showing testing points during an experiment comparing the transmitting levels between the antennas of the first and second embodiments.

FIG. 3A is a frequency multiplying circuit diagram of the first embodiment. In this circuit, a condenser and a coil provided on the circuit board 24 establishes a resonant circuit constant for frequency multiplying. FIG. 3B shows a frequency multiplying circuit diagram or the second embodiment. The experiment was conducted by measuring four points I, II, III, IV, with equal intervals between each other, around the antenna 28 as shown in FIG. 4. Point I is the portion where the disk antenna 28 is connected to the feeder wire 27. These four points I through IV were measured by a spectrum analyzer via a pick-up coil.

The results of this experiment, in which induced electromotive force was measured, are shown in the following tables.

DATA OF TRANSMITTING LEVEL (INDUCED ELECTROMOTIVE FORCE OF PICK-UP COIL IN dB$\mu$V)

| FIRST EMBODIMENT | | | | |
| --- | --- | --- | --- | --- |
| No./Point | I | II | III | IV |
| 1 | 51.4 | 53.5 | 53.8 | 52.7 |
| 2 | 51.7 | 53.8 | 53.6 | 52.7 |
| 3 | 51.6 | 53.6 | 53.9 | 52.9 |
| 4 | 51.7 | 53.3 | 53.5 | 52.5 |
| 5 | 51.6 | 53.5 | 53.7 | 52.6 |
| 6 | 51.7 | 53.7 | 53.7 | 52.4 |
| 7 | 51.8 | 53.6 | 53.5 | 52.4 |
| 8 | 51.8 | 53.4 | 53.3 | 52.4 |
| 9 | 51.6 | 53.9 | 53.8 | 52.7 |
| 10 | 51.5 | 53.4 | 54.1 | 52.6 |
| Average | 51.6 | 53.6 | 53.7 | 52.6 |

| SECOND EMBODIMENT | | | | |
| --- | --- | --- | --- | --- |
| No./Point | I | II | III | IV |
| 1 | 55.3 | 55.8 | 55.5 | 55.4 |
| 2 | 55.6 | 56.0 | 56.0 | 56.0 |
| 3 | 55.3 | 55.4 | 55.8 | 55.4 |
| 4 | 55.5 | 55.6 | 56.0 | 56.0 |
| 5 | 55.6 | 55.8 | 55.9 | 55.7 |
| 6 | 55.4 | 55.9 | 55.8 | 55.6 |
| 7 | 55.6 | 55.7 | 55.7 | 55.8 |
| 8 | 55.5 | 55.8 | 55.8 | 55.6 |
| 9 | 55.6 | 56.0 | 56.0 | 56.0 |
| 10 | 55.8 | 56.0 | 56.2 | 56.0 |
| Average | 55.5 | 55.8 | 55.9 | 55.9 |

Figure 5:
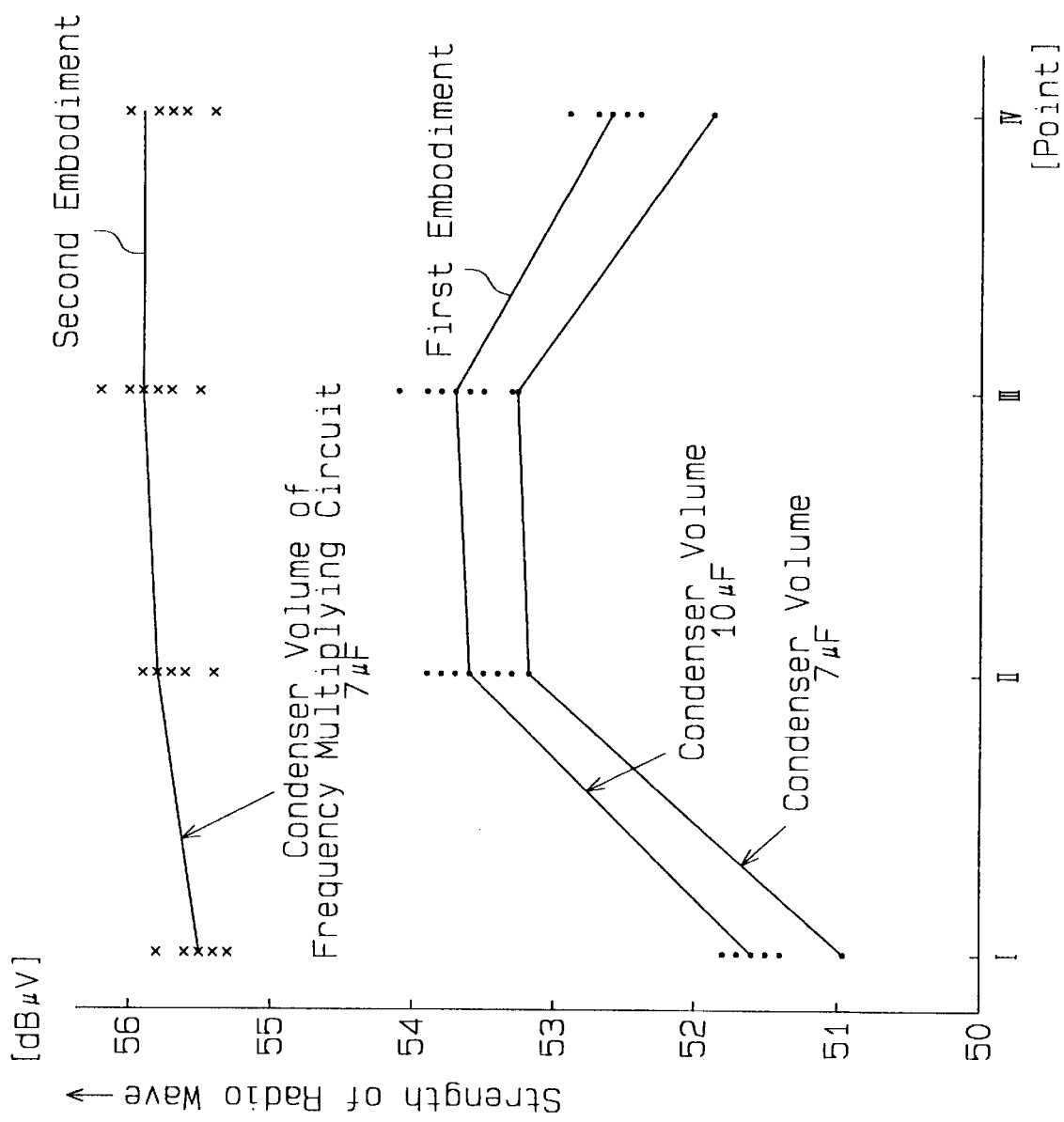
FIG. 5 is a diagram showing results of the experiment comparing the transmitting levels between the antennas of the first and second embodiment.

FIG. 5 graphically shows the results of the tables. By connecting the spiral feeder wire 27 to the antenna 28, the output of the antenna 28 becomes relatively constant between all four points I through IV. It is apparent that the output of the antenna 28 having a spiral lead wire is enhanced when compared with the antenna of the first embodiment.

In the second embodiment, as in the same manner with the first embodiment, the circuit board 24 is fixed inside the cap C by the silicone resin 34 thus preventing damage at the soldered portions of the electronic components 25, 25. Furthermore, moisture condensation between the electronic components does not occur.

Although only two embodiments of the present invention have been described herein, it should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope of the appended claims.

What is claimed is:

1. A tire pressure warning apparatus, adapted to be attached to a wheel of a vehicle, including a sensor for detecting a tire air pressure lower than a predetermined level and a transmitter for outputting a signal in accordance with an instruction from the sensor, said apparatus comprising:

a transmitting substrate disposed in the transmitter;

an antenna electrically connected to said substrate in the transmitter; and a non-conductive resin for securing said substrate in the transmitter;

said electrical connection of said antenna to said substrate being in the form of a coiled feeder wire.

2. The apparatus as set forth in claim 1, wherein said substrate includes electrical parts thereon.

3. The apparatus as set forth in claim 2, wherein said non-conductive resin includes silicone.

4. A tire pressure warning apparatus, adapted to be attached to a wheel of a vehicle, including a sensor for detecting a tire air pressure lower than a predetermined level and a transmitter for outputting a signal in accordance with an instruction from the sensor, said apparatus comprising:

a transmitting substrate disposed in the transmitter, said substrate including electrical parts thereon;

an electric power source, disposed in the transmitter, for supplying electric power to said substrate;

an antenna electrically connected to said substrate in the transmitter; and a non-conductive resin for securing said substrate, said power source and said antenna in the transmitter;

said electrical connection of said antenna to said substrate being by a coiled feeder wire.

5. A tire air warning apparatus including at least two contacts for making electrical contact with one another when air pressure in a tire is lower than a predetermined level, means for outputting a signal based on said electrical contact, and antenna means for transmitting a radio wave based on the signal from the outputting means, the generating means being electrically connected with the outputting means, said apparatus comprising:

means for housing the outputting means;

means for fixing the outputting means in said housing means; and spiral wire feeder means for electrically connecting the outputting means with the transmitting means.

6. The apparatus as set forth in claim 5, wherein said spiral wire feeder connecting means includes a coiled feeder wire.

7. A tire pressure warning apparatus including at least two contacts for making electrical contact with one another when air pressure in a tire is lower than a predetermined level, means for outputting a signal based on said electrical contact, and antenna means for transmitting a radio wave based on the signal from the outputting means, the antenna means being electrically connected with the outputting means, said apparatus comprising:

means for housing the outputting means;

means for fixing the outputting means in said housing means;

the outputting means comprising a transmitting substrate;

the antenna means comprising an antenna; and a coiled feeder wire for connecting said substrate with said antenna means.

8. The apparatus as set forth in claim 7, wherein said transmitting substrate includes a plurality of electric parts.

9. The apparatus as set forth in claim 7, wherein said fixing means includes a non-conductive resin.

10. The apparatus as set forth in claim 9, wherein said non-conductive resin includes silicone.

* * * * *